(No Model.)

E. SALOMON.
ROTARY CUTTING MACHINE.

No. 261,049. Patented July 11, 1882.

Witnesses:

Inventor
Etienne Salomon
Per
R. A. Mellows
Atty

UNITED STATES PATENT OFFICE.

ETIENNE SALOMON, OF MONTREAL, QUEBEC, CANADA, ASSIGNOR OF ONE-HALF TO EDMOND ARMANT, OF SAME PLACE.

ROTARY CUTTING-MACHINE.

SPECIFICATION forming part of Letters Patent No. 261,049, dated July 11, 1882.

Application filed April 7, 1882. (No model.)

*To all whom it may concern:*

Be it known that I, ETIENNE SALOMON, of the city of Montreal, in the District of Montreal and Province of Quebec, in the Dominion of Canada, have invented a certain new and useful Improvement in Rotary Cutters; and I do hereby declare that the following is a full, clear, and exact description of the same.

My invention relates to improvements in that class of rotary cutters which are used for making slots in metal plates, &c., and has for its object to produce a cutting-tool which will go entirely through the plate upon which it is to operate without offering any obstruction whatever in the shape of a shaft or axis, and one which will completely finish the slot from one side of the article, and thus avoid the necessity of filing or otherwise working out the corners.

Heretofore in cutting-tools of this description it has been absolutely necessary for the rotary cutter to have a shaft through its center to serve as an axis for it to revolve upon, and thus it has been impossible to cut right through the plate without leaving the corners incomplete, or necessitates a double set of cutters, or requires the plate or article to be reversed and the operation again performed from the opposite side.

It will at once be seen that the reason of this is that however small the shaft or spindle of the rotary cutter may be in proportion to its diameter, said cutter cannot pass through the material upon which it is operating farther than the outer diameter of its shaft will allow, thus leaving uncut a part of the slot equal to at least half the diameter of the cutter-shaft.

My invention consists broadly in substituting for a shaft as a means for the cutter to revolve upon a pair of eyes or lugs projecting from the cutter-stock and countersunk in said rotary cutter so that they may not be more than flush with the sides of same, and in rotating said cutter by means of a gear-wheel intermeshing with the teeth of said cutter.

For more complete comprehension, however, of my improvement, reference must be had to the accompanying drawings, in which letters of reference similar to those used in this specification indicate like parts.

Figure 1:
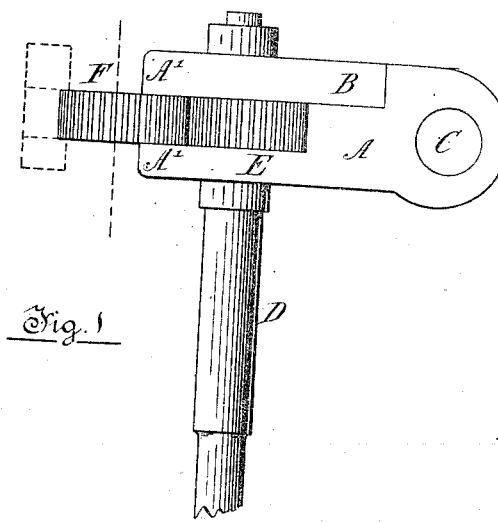
Figure 3:
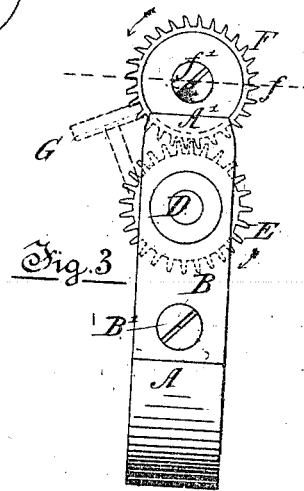
Figure 2:
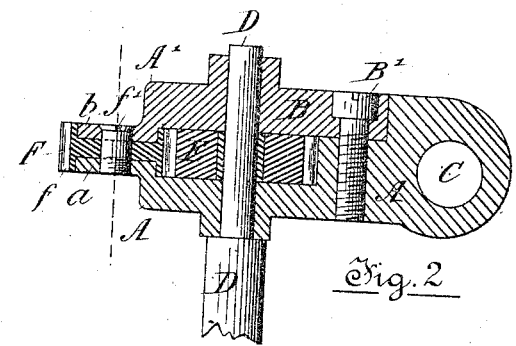

Figure 1 is an elevation of a cutter-stock arranged with driving-shaft to operate according to my invention; Fig. 2, a transverse sectional elevation of same; Fig. 3, an end view, showing also in dotted lines a brush for clearing cutter-teeth; and Fig. 4, a sectional detail of a modification of my invention.

A represents any ordinary or suitable cutter-stock, but preferably of somewhat the shape shown, and made with a removable piece, B.

C is an eye for affixing the cutter stock to a machine or table. It is obvious, however, that different means of attachment may be used at discretion or according to circumstances.

The removable piece B is attached to the cutter-stock proper by a screw, B', or other suitable device.

D is a shaft or spindle, to which a revolving motion is given in any convenient way. This shaft passes through and has its bearings in the cutter-stock A and removable piece B, between which, in a space left for the purpose, is placed a toothed wheel, E, firmly mounted on said shaft D and revolving with it.

The rotary cutter F is constructed with teeth $f$, each having a knife-edge, as shown more particularly in Fig. 3. These teeth $f$ intermesh with the toothed wheel E, so that as the latter revolves in one direction the cutter turns in the other, thus insuring that the knife-edges cannot be injured by so intermeshing, as it will be seen that the teeth of the wheel E always bear against the reverse side of the cutting-teeth $f$.

Figure 4:
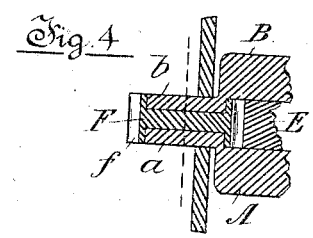

The rotary cutter F has hollow or annularly-channeled sides, as shown in Figs. 2 and 4, and the cutter-stock A and movable piece B have eyes or lugs (marked respectively $a$ and $b$) preferably made in one therewith, which fit or are countersunk into the hollow or channeled sides of said rotary cutter F, so as to be flush with or lower than the outer sides of said cutter.

In Fig. 2 I have shown a screw, $f'$, passing through the eyes or lugs $a$ $b$ and cutter F; but this screw may be omitted, as in Fig. 4, since it is not required for the cutter to rotate upon, but is only inserted in some cases to hold the eye $b$ or outer extremity of the movable piece B' firmly to the cutter-stock proper.

It will be seen that the shorter the cutting-teeth are made the larger I may make the eyes or lugs *a b*, and consequently the distance of the shoulders A' A' of the cutter-stock from the center of the rotary cutter will be increased, and the cutter will be thus allowed, when working, to penetrate considerably past its center through the plate or article operated upon.

In Fig. 3 a brush, G, is shown in dotted lines for the purpose of cleaning away shavings, &c., from the cutting-teeth *f* before they intermesh with the toothed wheel E; but this brush is not always necessary, and may be used at discretion.

The operation of my invention will be so clearly understood from the foregoing as to need no further description.

What I claim, and desire to secure by Letters Patent, is as follows:

1. A rotary cutter revolving upon projections from the cutter-stock, said projections being sunk in the sides of the cutter, substantially as and for the purpose described.

2. The combination, with a cutter-stock, of a spur driving-wheel and a rotary cutter, substantially in the manner herein set forth.

3. The combination, with the cutter-stock A, having removable piece B fastened thereto by screws B' and *f'*, and provided with eyes or lugs *a b*, of the rotary cutter F, revolved through toothed wheel E by shaft D, substantially as and for the purpose set forth.

ET. SALOMON.

Witnesses:
R. A. KELLOND,
I. A. RENNIE.